FLAT BAND METHOD OF MAKING RADIAL TIRES

Filed June 4, 1971

United States Patent Office 3,756,883
Patented Sept. 4, 1973

3,756,883
FLAT BAND METHOD OF MAKING RADIAL TIRES
Clarence Russell Gay, Akron, Ohio, assignor to The Firestone Tire & Rubber Company, Akron, Ohio
Filed June 4, 1971, Ser. No. 150,128
Int. Cl. B29h 9/02, 17/26
U.S. Cl. 156—123           1 Claim

ABSTRACT OF THE DISCLOSURE

This disclosure relates to a radial ply tire wherein the tread ply belt was constructed having reinforcing cords comprised of a low tensile strength core around which the tire reinforcing cable was helically wrapped so that in the expanded, finished tire the tread ply belt cords had the reinforcing cables fully extended and adjacently aligned and the low tensile strength cores have broken in several places along their length. This radial ply tire construction permits the building of the radial ply tire by the single stage method.

BACKGROUND OF THE INVENTION

The radial ply tire construction has been known for many years and has received wide acceptance in the European countries. It is only within the past 10 years that the radial ply tire has been seriously considered for commercial exploitation in the United States. This lack of exploitation in the United States has been due principally to the cost of manufacture in the radial ply type tire construction. A great portion of the high cost of manufacture in the radial ply construction is attributed mainly to the labor costs that have been necessary to construct a radial ply tire in the past.

One of the objects of this invention is to provide a radial ply tire that can be manufactured in an economical way to thereby produce a radial ply tire that is competitive price wise with the standard conventional bias angle tire.

In a radial ply tire, the construction comprises one or more body plies that have their cords running radially in relation to the axis of rotation of the tire so that each of the cords forms an approximate 90° angle to the circumferential tread centerline of the tire. In addition to these radial body plies, the radial tire construction contains a high modulus tread ply belt of one or more plies of tire reinforcing fabric. The advantages of the radial ply construction are obtained through the high modulus nature of the tread ply belt. It is this characteristic that resuls in less movement of the tread during operation of the tire thereby giving the increased resistance to tread wear that is the primary advantage of the radial ply tire construction.

However, this high modulus characteristic of the tread ply belt leads to varied problems in the building of the tire. All tires are manufactured in an open-ended, cylinder configuration and are expanded after their manufacture to the familiar toroidal, donut-like shape of a tire prior to vulcanization. In this expansion the overall diameter of the tire is significantly increased to the approximate overall diameter in the vulcanized, finished tire.

This expansion is permitted in the standard bias construction tire by the pantographing of the cords in the various body plies. By this pantographing of the body cords, the tire does not resist the expansion necessary to form the toroidal shape. This expansion may be performed either in an independent bagging process or in a process in which a bladder is inserted into the tire and expanded immediately prior to the vulcanization operation of the tire. The pantographing permits the expansion of the cylinder into the donut-like shape by permitting the angles of the cords in the respective plies to change going from a higher angle to a lower angle in relation to the circumferential tread centerline of the tire.

In the conventional radial ply construction, the high modulus nature of the tread ply belt, even in its green or unvulcanized state, does not permit the pantographing necessary for the expansion of the tire from the smaller diameter cylindrical configuration to the larger diameter toroidal configuration. The primary commercial method of building a radial ply tire has included two distinct building stages, as opposed to the single stage for the conventional tire. In the past, as the first stage the body plies in a radial ply tire have been built in the conventional method on a cylindrical, flat tire building drum. As the second stage, these body plies are then expanded into the toroidal shape by a bladder arrangement and the inextensible tread ply band applied to this expanded, toroidal shape body at its outer circumference. The cost of this second stage building has greatly reduced the marketability of such a tire.

It is an object of this invention to provide a radial ply tire construction that is capable of single stage tire building whereby the complete tire construction is accomplished on the conventional, flat cylindrical tire building drum and the expansion of the tire into the toroidal shape is accomplished by the standard methods used to expand conventional tires prior to vulcanization. The construction of this invention, therefore, must be capable of this expansion while still retaining the essential high modulus characteristic in the final tread ply belt.

It is this essential high modulus characteristic that is necessary in the tread ply belt of a radial ply tire that has prevented the commercialization of single stage building in radial ply tires. Many workers have been concentrating their efforts in this area to develop tire constructions that retain the necessary high modulus in the tread ply belt of the finished tire while permitting the expansion necessary in the tire manufacturing operation to produce a feasible single stage radial ply tire construction. As an example, some of the efforts in this area have been disclosed in patents: U.S. 3,486,546; 3,455,100; 3,540,512; 3,560,286; 3,409,492; and German 1,017,776.

SUMMARY OF INVENTION

The construction of this invention enables the manufacture of a radial ply tire by the single stage method, through the use of a low tensile strength core about which a textile yarn cable is helically wrapped. The construction of this invention allows the 30% to 80% expansion of the flat, cylindrical shaped green or unvulcanized tire into the toroidal shape of the vulcanized tire by the abrupt change in the cord tensile modulus when the applied load during tire expansion ruptures the low tensile core; thereby allowing the helically wrapped textile material to elongate to its full length, changing from a relatively low tensile modulus to a relatively high tensile modulus cord. This construction, therefore, allows the expanded finished tire to have a high tensile modulus in the reinforcing cord to form the inextensible tread ply belt, while the cord construction of low tensile strength core and helically wrapped reinforcing cable allows the necessary expansion for single stage tire building.

This novel construction of this invention has several specific advantages over the constructions of the prior art. Due to the fact that the core in the cord construction of this invention actually ruptures, the reinforcing helically wrapped cable is permitted to fully extend to its natural aligned position and does not form a helic configuration around the core in the expanded and finished tire. In the constructions of the prior art, such as those exemplified by U.S. Patent 3,445,100 and its corresponding patents, the core does not rupture and the elastic memory of the elastomeric material in the core does not permit the reinforcing helically wrapped cable to assume its natural position.

In addition, this "break away" nature of the core in this construction permits a choice of materials to be utilized in the core; that is, materials such as cotton or rayon or very fine gauge glass or wire. It is, of course, essential that all of these materials be of such a low tensile strength that they will break or rupture as a result of the load that is placed upon the core during the expansion of the tire. The load required to rupture the core is between 2 and 15 pounds.

The cords of this construction also enable better factory control of the woven fabric during the processing of the fabric; that is, during the dipping and calendering operation and during the tire building on the flat drum. This better control is obtained due to the fact that the core in this construction has a low tensile strength which will rupture at the expansion loads of between 2 and 15 pounds load and this results in little or no elastic memory as compared to an elastic core in the prior art constructions. This low tensile of the core is not exceeded during the dipping, calendering or flat drum tire building operation so that core is not broken; it is exceeded during expansion of the tire so it is then the core breaks in several along its length.

The essence of the novel tire construction of this invention lies in the "break away" core that comprises part of the cord construction. The core has sufficient tensile strength necessary to resist breakage during the factory processing steps prior to the expansion of the tire (that is, the dipping, calendering, and flat tire building operation), yet is sufficiently fragile to rupture or break at several places along its length during the expansion of the tire into the toroidal shape for vulcanization. This breakage of the core results in an abrupt change in overall effective characteristics of the cord. This abrupt change is from the low modulus of the core and helically wrapped reinforcing cable to the high modulus of the extended reinforcing cable.

In the construction of this invention, the overall effective modulus of the cord is low when the helically wrapped reinforcing cable is unextended. The essential feature of this construction is that the physical nature of the cord construction in the tread ply belt abruptly changes from that of a low modulus tire cord to that of a high modulus tire cord. This change occurs during the expansion process in the tire building operation. As the load on tire expansion is initially applied to the "break away" core, little resistance is encountered as the core will rupture and the reinforcing cable is fully extended. When the cable has fully extended, the overall effective modulus of the cord abruptly changes from the prior low modulus to the higher modulus of the reinforcing cable. This higher modulus is effective only when the low tensile core is ruptured and the helically wrapped reinforcing cable is fully extended.

The novel tire construction of this invention has a tread belt that exhibits this low modulus when the tire is being built on the flat cylindrical drum and prior to the expansion of the tire. This low modulus permits the expansion (extension and pantographing of the cords) of the tire and as a result of this expansion, the low tensile strength core is ruptured and the reinforcing cable is fully extended resulting in the expanded toroidal shaped tire having a tread ply belt wherein the cords have the higher modulus properties of the fully extended helically wrapped reinforcing cables so that the tread ply belt forms an inextensible unit. This inextensible unit in the tread ply belt is necessary for and is the basis of the well known improvements that are derived from the radial ply tire construction.

In accomplishing this result, the novel tire construction of this invention comprises the above-identified cord construction in the plies of the tread ply belt. It is essential in this construction that the reinforcing cables of the cord in the finished tire be fully extended so that the tire will have the dimensional stability necessary for good handling characteristics and the long wear inherent in the radial ply tire construction.

The amount of stretch that the "break away" core material must be able to endure prior to breakage and the amount of helically reinforcing cable are adjusted in relation to the size and expansion requirement of the specific tire constructions so that in the finished, vulcanized tire construction the low tensile strength core will have broken in several places along its length and the reinforcing cable will be fully extended. This full extension of the reinforcing cable is the first of the two factors that occur during the expansion of the tire of this invention from the flat, cylindrical shape to the toroidal tire-like shape. After the inflation load has caused the low tensile strength core to rupture in several places along its length and has extended the reinforcing cable to its full length to realize the cable's inherent higher modulus nature, the continued expansion load causes the fully extended cables to pantograph to a predetermined angle.

In determining the proper construction and characteristics for the cord construction one must take into account the degree of expansion that is required of the tire in going from the flat, cylindrical shape to the toroidal shape and the amount of pantographing encountered by the tread ply belt cords during the expansion. The length of the cable in the cord construction must be such that it is properly located in the tire after these extending forces are applied to it during the tire expansion step and it has been fully extended.

The "break away" core in this construction should have a breaking point in the range of 2 to 15 pounds load. During the manufacturing operations prior to the expansion of the tire (that is, the dipping, calendering and flat drum tire building operations), the core of the cord construction carries the load for the construction. It is only in the expansion step that the load on the core is sufficiently high enough to rupture it thereby enabling the reinforcing cable to fully extend and accept its normal position in the expanded reinforcing belt.

It is contemplated that this invention functions within the range of 30 to 80% expansion from the flat, cylindrical shape to the donut-like, toroidal shape and that the reinforcing cable after this expansion and the resulting full extension thereof may have a twist in the range of 2×2 to 12×12 turns per inch in said cable.

BRIEF DESCRIPTION OF DRAWINGS

The invention of this application is better defined with the assistance of the following figures:

In FIG. 1 the cord construction that is utilized in the tread ply belt of the tire of this invention is identified generally as reference 9. This cord construction comprises the low tensile strength core, 10, around which is helically wrapped the high tensile strength tire reinforcing cable, 11. The low tensile strength core may be any of the standard tire materials, such as cotton, rayon, nylon or polyester. If it is desired to make the core out of high tensile modulus materials, such as steel wire or glass, these materials must be of sufficiently small gauge to permit their breakage during the loads that are caused by the tire expansion step. Basically, it is only necessary that the low tensile strength core be sufficiently weak so that it will rupture as a result of the load that is put on it during the expansion of the green tire into the toroidal shape.

The helically wrapped tire reinforcing cable may be any of the known tire cable materials, such as nylon, rayon, polyester, steel wire, glass, or the relatively new dimensionally stable, high modulus polyamides. This cable may have any of the various known cable constructions with different plies and different degrees of twists.

Figure 2:
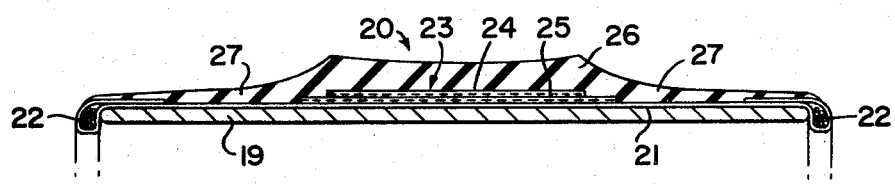
FIG. 2 is a cross-sectional view of the unvulcanized or green tire construction of this invention as it appears on the standard, flat tire building drum.

FIG. 2 exemplifies the tire construction of this invention as it would appear on the conventional, flat tire building drum in the flat, cylindrical green tire shape. This figure is a cross section of the tire building drum, 19, upon which the tire of this invention is generally shown as 20. The tire is built on the drum by first applying body ply 21 to the open-ended cylindrical drum 19. Next, the edges of the body ply are turned down over the edges of the drum and tire beads, 22, are placed axially outwardly of the body ply. The ends of the body ply are then turned up and axially inwardly to completely engulf the tire beads, 22.

Figure 1:
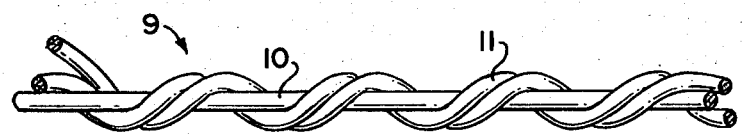
FIG. 1 exhibits the cord construction that is utilized in the tread ply belt of the radial tire construction of this invention.

Then the tread ply belt 23 is placed on the building drum on top of body ply 21 in the center of the building drum so that the tread ply belt will be in the center of the tread of the finished tire. This tread ply belt is comprised of tread plies 24 and 25. Each of these plies contains the cords that are depicted in FIG. 1. These cords are parallel to one another within each ply and are placed at equal and opposite angles in the respective plies. This angle is measured in reference to the circumferential tread centerline of the tire; that is, the angle in ply 25 will extend to the right of the tire and the angle in ply 24 will extend to the left of the tire. The angles of these tread plies in the green tire will be in the range of 16 to 50 degrees to the circumferential tread centerline of the tire; the angle of the cords that comprise body ply 21 will be substantially 90° to the circumferential tread centerline of the tire.

Next, the tread 26 and sidewall 27 are applied on top of the tread ply belts and the body ply of the tire. This operation completes the building of the green tire in its flat, cylindrical shape. The building drum 19 is then collapsed and the tire removed and sent to the tire vulcanizing press wherein the tire will be expanded and vulcanization will occur.

Figure 3:
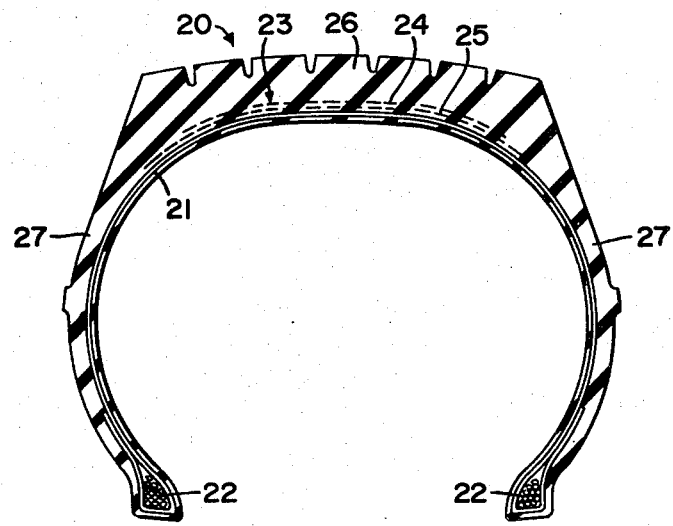
FIG. 3 is a cross-sectional view of the vulcanized or cured tire construction of this invention in its toroidal, finished shape.

FIG. 3 depicts the cross section of the tire of this invention after the tire has been expanded and vulcanized. In this figure the individual components of the tire are identical to those set out in FIG. 2 and are designated by the same reference number. In FIG. 3 the tire has assumed its toroidal, finished shape by being expanded through the insertion and subsequent inflation of a bladder or curing bag in the flat, cylindrical shape green tire of FIG. 2.

In the finished tire construction of Example 3, the cord angles of the cords in body ply 21 remain at 90° to the circumferential tread centerline during the expansion and vulcanizing operation. During the expansion process the cord angles in the plies 24 and 25 of the tread ply belt 23 have undergone pantographing so that their present angle to the circumferential centerline is between 12 to 40°. This pantographing occurred after the reinforcing cables of the cord had been extended to their full length by the expansion load which ruptured the low tensile strength core and fully extended the cable. This core breakage and full cable extension has resulted in an abrupt change of the modulus characteristic of the overall cord structure from the low modulus of the core and wrapped cable to the inherently higher modulus of the fully extended cable. This has resulted in the tread ply belt assuming the inextensible nature of the higher modulus reinforcing cable so that the tread ply belt unit has the necessary inextensible character for the radial ply tire construction.

The number of body plies and tread plies may be varied within a wide range; in FIGS. 2 and 3 the use of one body ply and two tread plies is exemplary and the invention is not limited to a tire containing only this number of plies.

Figure 4:
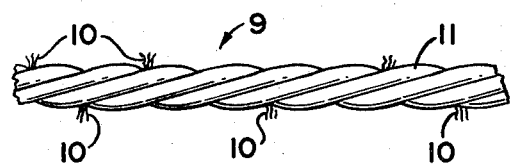
FIG. 4 exhibits the cord construction as it would appear in the tread ply belt of the toroidal, finished tire construction of this invention, as shown in FIG. 3.

FIG. 4 depicts the condition of the cord 9 in the tread ply belt after expansion as is exemplified in FIG. 3. In FIG. 4 the same reference numbers are used for the features of the cord as are used in FIG. 1. The condition of the cord in the expanded tire of FIG. 3 is shown by the core 10 being broken in several places in FIG. 4 and the reinforcing cable 11 being fully extended and aligned thereby losing its helically wrapped nature. This feature is essential to the construction of this invention as the reinforcing cable must be fully extended and aligned to give the tire construction stability and to prevent further growth of the tire during its operation.

In a specific embodiment of this invention, the cord is comprised of a textile core made of 20/3 cotton with the helically wrapped reinforcing cable being 2200/2 rayon. Four tread plies constructed of cords of this construction were utilized in an LR70-15 size radial ply passenger tire. Each of the tread plies had 16 ends per inch. The body ply comprised cords of standard 1650/3 rayon which were at an angle of 90° to the circumferential tread centerline both in the green flat, cylindrical tire and in the vulcanized toroidal tire.

The above-identified cords in the tread plies of the tire each had an angle of 45° to the circumferential tread centerline with this angle alternating from left to right with each ply beginning with the radially innermost ply. Upon expansion of the green tire to the toroidal shape the angle of the cords in the tread plies of the tread ply belt changed to 16° in relation to the circumferential tread centerline.

The tire of this construction has been tested and has been found to give satisfactory radial tire performance.

It is understood that other known features which are designed to give the tread ply belts an effective modulus or stiffness may be utilized with this invention without departing from this invention. Such other features are, for example, the use of a high modulus rubber compound as the ply skim which is placed on the fabric plies that are utilized in the tread ply belt.

What is claimed is:
1. In a single stage method of building a radial ply pneumatic tire, the steps comprising placing a tread ply belt on a tire carcass on a flat, cylindrical tire building drum wherein said tread ply belt is comprised of cords having a low tensile strength core consisting solely of textile material selected from a group consisting of cotton, rayon, nylon and polyester which breaks at a load between 2 and 15 pounds load and a reinforcing cable having a high tensile strength in relation to said core helically wrapped around said core wherein said core has sufficient diameter to provide a sufficient length in said helically wrapped reinforcing cable to insure said cable, when fully extended, will have sufficient length and strength to provide the reinforcement necessary in the said tread ply belt; completing the building of the uncured tire on said flat drum; expanding said flat tire into a toroidal shape whereby the expansion loads cause said low tensile strength cores to break at several places along their length thereby permitting said cables to align and to straighten out to their full length with substantially no helic configuration remaining in said reinforcing cables said breakage of the cores and extension of the cables resulting in an abrupt increase in the overall modulus of the said cords; pantographing said fully extended cables in said tread ply cords so that cords form lower angles to the circumferential tread centerline with said fully extended, pantographed cords resulting in the inextensible unit necessary in said radial ply construction; and vulcanizing said tire.

(References on following page)

References Cited

UNITED STATES PATENTS

| | | | |
|---|---|---|---|
| 2,884,044 | 4/1959 | Hulswit, Jr. et al. | 156—133 X |
| 3,560,286 | 2/1971 | Sidles et al. | 156—133 X |
| 3,409,492 | 11/1968 | Yoe | 156—128 I |
| 3,422,874 | 1/1969 | Weitzel | 156—123 X |
| 3,518,140 | 6/1970 | Smithkey | 156—123 |
| 3,525,654 | 8/1970 | Notani et al. | 156—133 |
| 3,540,512 | 11/1970 | Helmovies | 156—133 X |
| 3,657,039 | 4/1972 | Smithkey | 156—123 |
| 2,982,328 | 5/1961 | Emanueli et al. | 152—361 |

ALFRED L. LEAVITT, Primary Examiner

C. B. COSBY, Assistant Examiner

U.S. Cl. X.R.

156—128, 133

PO-1050
(5/69)

UNITED STATES PATENT OFFICE
CERTIFICATE OF CORRECTION

Patent No. 3,756,883          Dated September 4, 1973

Inventor(s) CLARENCE RUSSELL GAY

It is certified that error appears in the above-identified patent and that said Letters Patent are hereby corrected as shown below:

Column 1, line 51 "resuls" should read --results--;

Column 2, line 71 "445" should read --455--;

Column 3, line 26 "several along" should read --several places along--;

Column 3, line 39 "high" should read --higher--

Signed and sealed this 18th day of December 1973.

(SEAL)
Attest:

EDWARD M. FLETCHER, JR.
Attesting Officer

RENE D. TEGTMEYER
Acting Commissioner of Patents